Patented Feb. 19, 1935

1,992,010

UNITED STATES PATENT OFFICE 1,992,010

WATERPROOFING AND POLISHING COMPOUND FOR WOOD

Harvey G. Kittredge, Dayton, Ohio, assignor to The Kay & Ess Chemical Corporation, Dayton, Ohio, a corporation of Delaware No Drawing. Application March 5, 1934, Serial No. 714,097

19 Claims. (Cl. 134—24)

My invention relates to a new article of manufacture for use as a waterproofing and polishing compound for wood, to the method of manufacture thereof and to the method of application to the wood.

In particular, it is my object to provide a compound which dries within a brief period at room temperature in the air and, immediately upon drying, can be polished to provide a finish on the wood.

It is the object of my invention to provide a waterproofing compound capable of taking a high polish that is not affected by such materials as acetone, which gives a high lustre finish to the wood treated and impregnates the wood to render it waterproof.

It is a further object to provide such a compound which is particularly adaptable to shoe lasts, shoe heels and the like, which is capable of not only taking a high polish but, upon becoming dull, to be repolished by additional buffing.

It is a further object to provide such a compound in combination with wood as to form an extremely smooth surface so that the last and shoe can be parted without the necessity of chalking the last and without the necessity of heel stripping, thereby effecting a very material economy in the production of shoes.

It is my object to provide a compound which will not be affected by the acetone in the cellastic backing employed in connection with the building of shoes on wooden shoe lasts.

It is a further object to provide a compound in which the proportion of China wood oil can be decreased in the composition of spar varnish and an equivalent amount of China oil can be added to the amount which is added to the wax or other elements of the spar varnish.

It is a further object to provide a compound which can be made up and kept indefinitely without precipitation.

It is a further object to provide such a compound, the components of which according to the condition of the wood to be treated can be varied within certain predetermined limits based upon a basic proportion or amount of spar varnish.

In particular, it is my object to provide a compound comprising varnish and wax applied to the wood to be treated simultaneously, the compound being allowed to penetrate the wood and become an integral part thereof. The result is a waterproof piece of wood which can be repeatedly buffed and repolished, which has a finish that is very smooth and very hard and which resists the action of such solvents as acetone.

My invention comprises a mixture of a varnish, such as spar varnish, for example, and a wax, such as paraffin wax, for example.

While not essential to my invention, yet I find that the application and subsequent use of the compound on wood is facilitated by combining the spar varnish with penetrating oil, such as China wood oil, a thinner and a drier.

A typical mixture which I have found to have highly satisfactory results in practice with shoe lasts is the following. I select a spar varnish made as follows. I melt 50 pounds of rosin ester, which is a combination of rosin and glycerin, in 28 gallons of raw China wood oil. I melt the mixture until the temperature reaches 400° Fahrenheit and I then add 3½ pounds of litharge running the temperature up to 560–570° Fahrenheit. I then add immediately 50 pounds more of the rosin ester stirring until melted which will bring down the temperature to about 550° Fahrenheit. I then add ½ pound of precipitated cobalt linoleate. I then cool the mixture to 440–450° Fahrenheit. Thereafter, I add 60 gallons of petroleum naphtha. This completes the spar varnish.

It will be understood that various types of varnish can be employed, but I prefer a spar varnish of this compound.

Example A

I mix 10½ gallons of this spar varnish with the following: 4¼ gallons of China wood oil which has been heated to 400° Fahrenheit for about 3½ hours; 40 gallons of petroleum naphtha and/or coal tar penetrating agent and thinners; 5 gallons of gum turpentine or wood turpentine or any equivalent pine oil having similar characteristics; ½ gallon of manganese drier made by dissolving 3 pounds of manganese resinate in one gallon of turpentine; ¼ gallon of tri-metal drier comprised of lead linoleate, cobalt linoleate and manganese linoleate with turpentine. The latter tri-metal drier is made up according to the formula of 385 pounds of lead linoleate, 887 pounds of cobalt linoleate, 14 pounds of manganese linoleate and 1202 gallons of turpentine, either gum or wood turpentine.

I then place in approximately a 75-gallon container 45⅜ pounds of paraffin wax and melt it therein; and I then add, while the wax is warm, the above mixture to the extent of 60½ gallons constantly stirring as the material is mixed and kept in melted condition. I then allow it to cool whereupon my compound is in finished condition.

Good results may be obtained by using the spar varnish as just described combined with wax and thinner as follows:

Example B

I melt 13 pounds of paraffin wax. When melted I add with constant stirring 10½ gallons of the spar varnish just described, 14 gallons of petroleum naphtha or coal tar thinner, or a mixture of both and 2½ gallons of gum or wood turpentine or pine oil.

The opposite extreme that will give good results is as follows:

Example C

I melt 51½ pounds of paraffin wax in a suitable container of about 125 gallon capacity and, when melted, add 10½ gallons of spar varnish described above, 14 gallons of China wood oil that has been heated to 400° Fahrenheit for 3½ hours, 68 gallons of petroleum or coal tar naphtha, or a mixture of both, 9 gallons of wood gum turpentine or pine oil, 1 gallon of manganese drier described above and ½ gallon tri-metal drier described above.

Examples B and C represent the extremes in the percentages of China wood oil which may be used, and both have the minimum of paraffin wax which may be used. In both examples, the paraffin wax may be doubled with the further addition of 10% of both thinners, and in all cases the resulting mixture will give a solution that will be clear and which may be polished after the treated articles, such as wood lasts, have been immersed for twenty minutes and allowed to drain for thirty minutes thereafter.

As an example of the ranges of the various elements of the combination where a given amount of spar varnish is employed, I set forth the following:

Example D 21 parts of spar varnish; 0 to 32 parts of China wood oil; 2 to 21 parts of paraffin wax; 28 to 138 parts of petroleum and coal tar naphtha; 5 to 18 parts of gum or wood turpentine or pine oil; and 0 to 3 parts of drier described above.

Example E 21 parts by volume of spar varnish; 6 to 32 parts by volume of China wood oil; 8 to 12 parts by volume of wax; 1 to 6 parts by volume of wax; 1 to 6 parts by volume of tri-metal drier, 6 to 3 parts by volume of penetrating agent, such as gum turpentine; and 53 to 250 parts of petroleum thinner.

Example F 21 parts by volume of spar varnish; 9 parts by volume of China wood oil; 9 parts by volume of paraffin wax; and a suitable penetrating agent and thinner.

Example G 21 parts by volume of rosin ester varnish; 9 parts by volume of China-wood oil; 9 parts by volume of paraffin wax; and a suitable penetrating agent and thinner.

Example H 21 parts by volume of rosin ester varnish; 6 to 32 parts by volume of China wood oil; 8 to 12 parts by volume of paraffin wax, and a suitable penetrating agent and thinner.

It will be understood that, when I refer to "spar varnish", I include a rosin ester varnish.

I further call attention to the fact that it is important to so balance the thinner and penetrating agents as to get a complete, rapid and homogeneous impregnation of the hard wood structure, such as maple, by a mere immersion: it is further important to have a rapid drying of the compound so that the wood so treated will quickly air dry at ordinary room temperature without the expense of forced draft.

It is likewise important that the compound, while being manufactured, used, shipped or stored, does not precipitate but, upon being used as a compound for treating wood, it will penetrate the wood and leave on the surface of the wood a hard wax finish which can be converted into a smooth hard brilliant surface by immediate buffing upon drying.

As will be noted from the foregoing examples, of which Example B is a typical example, I am enabled to secure this result without any China wood oil although for many types of wood a much more desirable result is secured with it.

It will be understood that in the place of paraffin wax I may employ beeswax, ceresin wax, ozokerite, japan wax, bayberry wax, candelilla, or hard pressed stearic acid. Other equivalent waxes may be employed.

The function of the spar varnish with these constituent gums is to impart a hard waterproof finish, the surface of which is capable of taking a hard polish. The oils employed in the varnish and in the mixture of the waxes with the varnish are for the purpose of carrying the compound into the texture of the wood and to make it water resisting. The thinner also helps to permeate the wood and to cause an even flow over the surface and into the wood. The drier facilitates air drying of the wood after it has been treated as hereinafter described.

The interior waterproofing is carried out by the penetration of the China wood oil, while the exterior hard polish in combination with the waxes is facilitated by the gums, such as the rosin ester. The wax resists acetone action, facilitates the polishing of the surface, fills the surface pores of the wood and acts as a further waterproofing medium on the surface of the wood.

The process of applying this compound to the wood is as follows: The finished last or heel blocks, made of such woods as maple, which are extremely hard, are dipped in this compound of my invention at room temperature for approximately 20 minutes, or more. They are then drained of the surplus liquid and allowed to dry. After they have air dried for a period of from 20 to thirty minutes, room temperature, depending upon current moisture and temperature conditions, they are polished resulting in a natural wood finish revealing the grain of the wood. An ordinary wood last is penetrated a considerable distance below its surface by this compound and, in many instances, is completely saturated throughout with it.

The resulting finish is extremely hard, very smooth and waterproof.

In the manufacture of shoes, the finish is such that the present practice of chalking the lasts is eliminated. The sticking of the acetone, as in the use of cellastic backing, is eliminated as the compound is impervious to acetone action. Heel stripping is also eliminated. These three factors alone constitute a very large saving in the cost of manufacturing shoes.

I particularly call attention to the fact that, by mixing the varnish and wax and applying it to the wood as a single compound, I secure this result.

The proportions mentioned are not exclusive as many other different proportions can be employed, but I have found that the proportions indicated in actual practice are successful and satisfactory proportions. Naturally, such proportions are varied according to the conditions under which the compound is employed and varying conditions of temperature and humidity as well as variations in the natural product, such as the wood being treated.

I comprehend within my invention the practice of expediting the application of this material of my invention by placing the wood in a chamber subjected to a vacuum of approximately 2–4 inches and, when the air has been withdrawn from the wood, I then apply the compound so that it will cover the lasts or other wood articles; and, thereafter, I apply 50–60 pounds of pressure to force the compound into the wood so that it will thoroughly penetrate the wood. Thereafter, the lasts are drained and dried.

It will be understood that when I refer to a last I refer to any article of wood.

It will be further understood that I desire to comprehend within my invention such modifications as may be necessary to adapt it to varying conditions and uses.

This application is a continuation-in-part of my co-pending application Serial No. 617,471, filed June 15, 1932, for a waterproofing and polishing compound for wood.

Having thus fully described my invention, what I claim as new and desire to secure by Letters Patent, is:

1. A new article of manufacture for use as an air-drying, waterproofing and polishing compound for wood adapted to be buffed immediately upon drying to provide a hard, waterproof finish on wood, comprising 10½ gallons of spar varnish, 14 gallons of petroleum or coal tar thinner, or a mixture of both, 2½ gallons of gum or wood turpentine or pine oil, and 13 pounds of paraffin wax.

2. A new article of manufacture for use as an air-drying, waterproofing and polishing compound for wood adapted to be buffed immediately upon drying to provide a hard, waterproof finish on wood, comprising 10½ gallons of spar varnish, 15⅜ gallons of petroleum or coal tar thinner, or a mixture of both, 2¾ gallons of gum or wood turpentine or pine oil, and 26 pounds of paraffin wax.

3. A new article of manufacture for use as an air-drying, waterproofing and polishing compound for wood adapted to be buffed immediately upon drying to provide a hard, waterproof finish on wood, comprising 10½ gallons of spar varnish, 14 gallons of heat-treated China wood oil, 68 gallons of petroleum or coal tar thinner, or a mixture of both, 9 gallons of gum or wood turpentine or pine oil, and 51½ pounds of paraffin wax.

4. A new article of manufacture for use as an air-drying, waterproofing and polishing compound for wood adapted to be buffed immediately upon drying to provide a hard, waterproof finish on wood, comprising 10½ gallons of spar varnish, 14 gallons of heat-treated China wood oil, 75 gallons of petroleum or coal tar thinner, or a mixture of both, 10 gallons of gum or wood turpentine or pine oil, and 103 pounds of paraffin wax.

5. A new article of manufacture for use as an air-drying, waterproofing and polishing compound for wood adapted to be buffed immediately upon drying to provide a hard, waterproof finish on wood, comprising a mixture of spar varnish with additional heat-treated China wood oil, a drier, a water-repellant and polishing medium, such as paraffin wax, of such consistency that the mixture will readily penetrate hard, close-grained wood, will dry so as to be polished within 30 minutes after application and, when applied, will be in a clear solution at 70 to 80 degrees Fahrenheit.

6. A new article of manufacture for use as an air-drying, waterproofing compound to provide a highly polished hard surface on wood, comprising 21 parts of spar varnish, from 0 to 32 parts of China wood oil, from 2 to 21 parts of paraffin wax, from 28 to 138 parts of petroleum or coal tar naphtha, from 5 to 18 parts of gum or wood turpentine or pine oil, and from 0 to 3 parts of tri-metal drier.

7. A new article of manufacture for use as a waterproofing and polishing compound for wood, comprising 21 parts by volume of spar varnish, 6 to 32 parts by volume of China wood oil, 1 to 6 parts by volume of tri-metal drier, 8 to 12 parts by volume of wax, 6 to 32 parts by volume of heat bodied drying oil, and 53 to 250 parts by volume of thinner.

8. A new article of manufacture for use as a waterproofing and polishing compound for wood, comprising 21 parts by volume of spar varnish, 9 parts by volume of China wood oil, 1 to 6 parts by volume of tri-metal drier, 9 parts by volume of wax, 6 to 32 parts by volume of heat bodied drying oil, and 53 to 250 parts by volume of thinner.

9. A new article of manufacture for use as a waterproofing and polishing compound for wood, comprising 21 parts by volume of rosin ester varnish, 9 parts by volume of China wood oil, 1 to 6 parts by volume of tri-metal drier, 9 parts by volume of wax, 6 to 32 parts by volume of heat bodied China wood oil, and 53 to 250 parts by volume of thinner.

10. A new article of manufacture for use as a waterproofing and polishing compound for wood, comprising 21 parts by volume of rosin ester varnish, 6 to 32 parts by volume of China wood oil, 1 to 6 parts by volume of tri-metal drier, 8 to 12 parts by volume of wax, 6 to 32 parts by volume of heat bodied China wood oil, and 53 to 250 parts by volume of thinner.

11. A new article of manufacture for use as a waterproofing and polishing compound for wood comprising a waterproof spar varnish, a heat bodied China wood oil, a wax, a thinner, and coal tar, said heat bodied China wood oil serving as a penetrant for carrying said varnish and a part of the wax into the wood.

12. A new article of manufacture for use as a waterproofing and polishing compound for wood comprising a waterproof spar varnish, a heat bodied drying oil, a wax, and a petroleum thinner, said heat bodied drying oil serving as a penetrant for carrying said varnish and a part of the wax into the wood.

13. A new article of manufacture for use as a waterproofing and polishing compound for wood comprising a waterproof spar varnish, a heat bodied drying oil, a wax, and a petroleum thinner, a gum of wood turpentine, said heat bodied drying oil serving as a penetrant for carrying said varnish and a part of the wax into the wood.

14. A new article of manufacture for use as a waterproofing and polishing compound for wood comprising a waterproof spar varnish, a heat bodied China wood oil, a wax, and a petroleum thinner, said heat bodied China wood oil serving as a penetrant for carrying said varnish and a part of the wax into the wood.

15. A new article of manufacture for use as a waterproofing and polishing compound for wood comprising a waterproof spar varnish, a heat bodied drying oil, a wax, a thinner comprising a mixture of petroleum and coal tar, said heat bodied drying oil serving as a penetrant for carrying said varnish and a part of the wax into the wood.

16. A new article of manufacture for use as a waterproofing and polishing compound for wood, in combination, 10½ gallons of spar varnish, 4¼ gallons China wood oil heated to about 400° Fahrenheit for three and one-half hours, 40 gallons petroleum naphtha, 5 gallons turpentine, ½ gallon manganese drier, ¼ gallon of a drier comprising lead linoleate, cobalt linoleate, manganese linoleate and turpentine, and 45⅜ pounds of paraffin wax.

17. A new article of manufacture for use as a quick drying liquid waterproofing and polishing compound for wood comprising 21 parts by volume of spar varnish, 9 parts by volume of heat-treated China wood oil, 9 parts by volume of wax, 80 parts by volume of petroleum naphtha, 10 parts by volume of turpentine, and 1½ parts by volume of liquid metallic organic drier.

18. A new article of manufacture for use as a waterproofing and polishing compound for wood, comprising a waterproof spar varnish, a heat bodied drying oil, a drier, a wax, and a thinner, said heat bodied drying oil serving as a penetrant for carrying said varnish and a part of the wax into the wood.

19. A new article of manufacture for use as a waterproofing and polishing compound for wood, comprising a waterproof spar varnish, a heat bodied China wood oil, a drier, a wax, and a thinner, said heat bodied China wood oil serving as a penetrant for carrying said varnish and a part of the wax into the wood.

HARVEY G. KITTREDGE.